United States Patent
Endo et al.

(10) Patent No.: US 8,437,915 B2
(45) Date of Patent: May 7, 2013

(54) STEERING CONTROLLER

(75) Inventors: Masaya Endo, Tokyo (JP); Masahiko Kurishige, Tokyo (JP); Isao Kezobo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 187 days.

(21) Appl. No.: 12/811,281

(22) PCT Filed: Jan. 30, 2008

(86) PCT No.: PCT/JP2008/051401
§ 371 (c)(1),
(2), (4) Date: Jun. 30, 2010

(87) PCT Pub. No.: WO2009/096008
PCT Pub. Date: Aug. 6, 2009

(65) Prior Publication Data
US 2010/0286870 A1    Nov. 11, 2010

(51) Int. Cl.
| A01B 69/00 | (2006.01) |
| B62D 6/00 | (2006.01) |
| B62D 11/00 | (2006.01) |
| B62D 12/00 | (2006.01) |
| B63G 8/20 | (2006.01) |
| B63H 25/04 | (2006.01) |

(52) U.S. Cl.
USPC .............................................. 701/41; 701/42

(58) Field of Classification Search .................... 701/41, 701/42
See application file for complete search history.

(56) References Cited

U.S. PATENT DOCUMENTS

| 6,161,068 | A | 12/2000 | Kurishige et al. | |
| 7,128,184 | B2 | 10/2006 | Satake et al. | |
| 7,128,185 | B2 | 10/2006 | Satake et al. | |
| 2003/0109974 | A1 | 6/2003 | Ishihara | |
| 2004/0162655 | A1* | 8/2004 | Patankar | 701/41 |
| 2006/0012323 | A1* | 1/2006 | Endo et al. | 318/432 |
| 2006/0022628 | A1 | 2/2006 | Okumatsu et al. | |
| 2007/0055425 | A1* | 3/2007 | Oya et al. | 701/41 |
| 2010/0004824 | A1 | 1/2010 | Ikeda et al. | |

FOREIGN PATENT DOCUMENTS

| EP | 1 308 368 | 5/2003 |
| JP | 61 24319 | 2/1986 |
| JP | 63-204159 | 8/1988 |
| JP | 2 193768 | 7/1990 |

(Continued)

OTHER PUBLICATIONS

European Office Action issued Nov. 7, 2012 in European Patent Application No. 08704164 (with English translation).

(Continued)

Primary Examiner — Thomas Tarcza
Assistant Examiner — Imran Mustafa
(74) Attorney, Agent, or Firm — Oblon, Spivak, McClelland, Maier & Neustadt, L.L.P.

(57) ABSTRACT

To accurately extract a pulsating component generated due to a cogging torque or a torque ripple to reduce a pulsation, the pulsating component is extracted using a bandpass filter having a variable time constant, and the time constant is set according to a frequency of cogging torque or torque ripple to be extracted. Further, a reference angle for a rotation angle of a motor is preset according to a generation harmonic order of the cogging torque or torque ripple, and the time constant of the bandpass filter is set from a time period required for the motor to rotate by the reference angle.

16 Claims, 12 Drawing Sheets

FOREIGN PATENT DOCUMENTS

| | | |
|---|---|---|
| JP | 02-202387 | 8/1990 |
| JP | 06035506 | 2/1994 |
| JP | 10 310072 | 11/1998 |
| JP | 10 324262 | 12/1998 |
| JP | 2000 312499 | 11/2000 |
| JP | 2001-251880 | 9/2001 |
| JP | 2001 258282 | 9/2001 |
| JP | 2002-193130 | 7/2002 |
| JP | 2002 234454 | 8/2002 |
| JP | 2003 137110 | 5/2003 |
| JP | 2003 312521 | 11/2003 |
| JP | 2005 67359 | 3/2005 |
| JP | 2006 36078 | 2/2006 |
| JP | 2006 149176 | 6/2006 |

OTHER PUBLICATIONS

Japanese Office Action issued Oct. 23, 2012 in Japanese Patent Application No. 2009-551359 (with English translation).

* cited by examiner

STEERING CONTROLLER

TECHNICAL FIELD

The present invention relates to a steering control device, in particular, a steering control device for extracting and reducing a pulsating component generated due to a cogging torque or a torque ripple of an electric motor.

BACKGROUND ART

As a steering control device for automobiles, an electric power steering device is used. The electric power steering device controls a current of an electric motor and transmits an electric motor torque generated according to the current to a steering shaft, thereby reducing a steering torque to be applied by a driver.

In general, the torque generated by the electric motor contains a cogging torque or a torque ripple. The cogging torque and the torque ripple act as disturbance torques to pulsate the steering torque, and hence the steering feel is degraded in some cases. In order to prevent the degradation of the steering feel, an expensive motor has been used so as to reduce the cogging torque and the torque ripple of the motor.

In a conventional steering control device for automobiles, compensation control using the electric motor is performed so as to extract a pulsating component due to the cogging torque or the torque ripple to reduce the pulsation of the steering torque (for example, see Patent Document 1).

As another conventional steering control device for automobiles, there is an electric power steering device using a variable time-constant filter. In the electric power steering device, noise is removed by a lowpass filter having a time constant that is variable according to an angular velocity of a steering wheel (for example, see Patent Document 2).

Patent Document 1: JP 2005-67359 A (FIG. 1)
Patent Document 2: JP 3884236 B (FIG. 3)

DISCLOSURE OF THE INVENTION

Problem to be Solved by the Invention

When the compensation control using the electric motor is performed so as to reduce the pulsation of the steering torque and the pulsation of a motor rotation angle due to the cogging torque or the torque ripple, it is necessary to obtain as accurate as possible a pulsating component generated due to the cogging torque or the torque ripple to compute a compensation current for reducing the pulsating component.

In the steering control device, however, a motor rotation angular velocity becomes an arbitrary velocity because the driver steers the steering wheel at will. The cogging torque and the torque ripple are torque pulsations generated depending on the motor rotation angle, and hence a frequency of the pulsation of the steering torque or the like, which is generated due to the cogging torque or the torque ripple, varies according to the motor rotation angular velocity. Therefore, if the cogging torque or the torque ripple is to be extracted by a filter with a fixed time constant, it is necessary to set a wide range for a passband frequency of the filter. Thus, there is a problem that a component other than the pulsating component due to the cogging torque or the torque ripple, for example, a steering component of the driver or a noise component in a frequency band higher than the frequency of the pulsating component cannot be sufficiently removed.

If the compensation control is set with the extracted pulsating component from which the steering component of the driver, the noise component, and the like are not sufficiently removed, the steering feel of the driver may change. Thus, the accurate extraction of the pulsating component generated due to the cogging torque or the torque ripple while the driver is steering the steering wheel is a major issue for the execution of the compensation control for reducing the pulsation.

The present invention has been made to solve the problems described above, and has an object of providing a steering control device capable of accurately extracting a pulsating component generated due to a cogging torque or a torque ripple from sensor information obtained while a driver is steering a steering wheel, thereby reducing a pulsation of a steering torque and the like, which is generated due to the cogging torque or the torque ripple.

Means for Solving the Problems

A steering control device according to the present invention includes: a torque detecting section for detecting a steering torque applied by a driver; a motor for generating an assist torque for assisting the steering torque; an electric power assist control section for computing a target current for electric power assist of the motor, which is required for generating the assist torque, based on the detected steering torque; an angle detecting section for detecting a rotation angle of the motor; a current control section for controlling a current of the motor so that the current of the motor becomes equal to the target current for electric power assist; a variable time-constant filter having a variable time constant; a time-constant computing section using the rotation angle of the motor, which is detected by the angle detecting section, to compute a time constant corresponding to a frequency of a cogging torque or a torque ripple generated by the motor to set the time constant for the variable time-constant filter; and a filter processing computing section for performing filter processing on a state quantity including the steering torque and the rotation angle of the motor by the variable time-constant filter.

Effects of the Invention

The steering control device according to the present invention includes: the torque detecting section for detecting a steering torque applied by a driver; the motor for generating an assist torque for assisting the steering torque; the electric power assist control section for computing a target current for electric power assist of the motor, which is required for generating the assist torque, based on the detected steering torque; the angle detecting section for detecting a rotation angle of the motor; the current control section for controlling a current of the motor so that the current of the motor becomes equal to the target current for electric power assist; the variable time-constant filter having a variable time constant; the time-constant computing section using the rotation angle of the motor, which is detected by the angle detecting section, to compute a time constant corresponding to a frequency of a cogging torque or a torque ripple generated by the motor to set the time constant for the variable time-constant filter; and the filter processing computing section for performing filter processing on a state quantity including the steering torque and the rotation angle of the motor by the variable time-constant filter. Thus, the pulsating component generated due to the cogging torque or the torque ripple can be extracted accurately from sensor information obtained while the driver is steering a steering wheel, thereby reducing the pulsation of the steering torque and the like, which is generated due to the cogging torque or the torque ripple.

BEST MODE FOR CARRYING OUT THE INVENTION

First Embodiment

Figure 1:
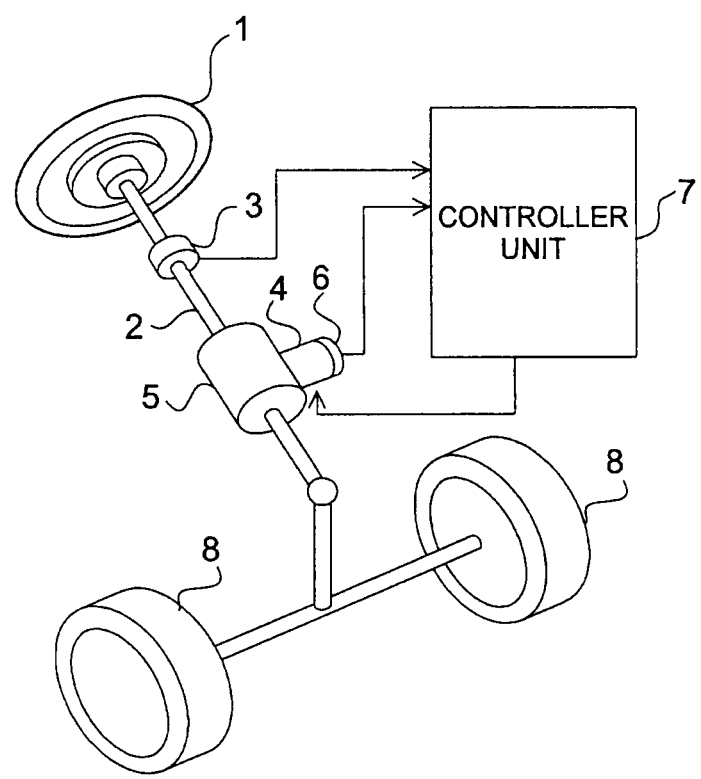
FIG. 1 is a perspective view illustrating a steering control device including a variable time-constant filter according to a first embodiment of the present invention.

FIG. 1 is a perspective view illustrating a steering control device including a variable time-constant filter according to a first embodiment of the present invention. A steering shaft 2 is connected to a steering wheel 1 operated by a driver. Right and left steered wheels 8 are turned according to the rotation of the steering shaft 2. A torque sensor 3 is provided to the steering shaft 2 to detect a steering torque exerted on the steering shaft 2, which is generated by an operation performed by the driver. A motor 4 is a three-phase motor. The motor 4 is coupled to the steering shaft 2 through an intermediation of a reducer mechanism 5. An assist torque generated by the motor 4 is applied to the steering shaft 2 to assist the steering torque. An angle sensor 6 for detecting a motor rotation angle is provided to the motor 4. A speed of a vehicle is detected by a vehicle-speed sensor 11 (illustrated in FIG. 2). A current flowing through the motor 4 is detected by current sensors 19 (illustrated in FIG. 2). A controller unit 7 includes an electric power assist control section 71 and a current control section 72. The electric power assist control section 71 computes a target current for electric power assist, corresponding to a target current of the motor 4, which is required to perform electric power assist control for assisting in steering of the driver, from the steering torque detected by the torque sensor 3 and the vehicle speed detected by the vehicle-speed sensor 11. The target current for electric power assist corresponds to a target value of the assist torque. The current control section 72 controls the current of the motor 4 so that the current detected by the current sensors 19 becomes equal to the target current for electric power assist.

Figure 2:
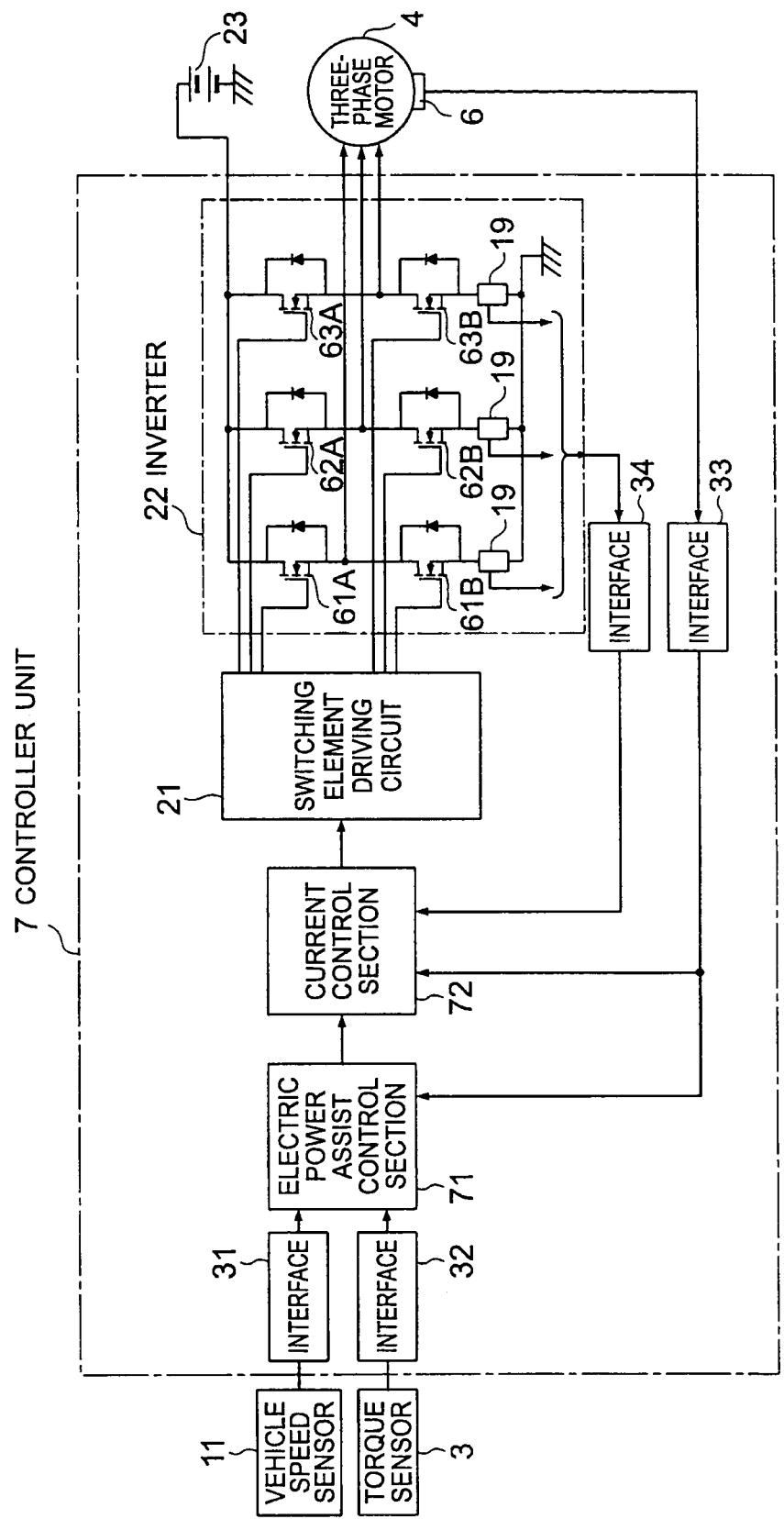
FIG. 2 is a block diagram illustrating a configuration of a controller unit 7 according to the first embodiment of the present invention.

FIG. 2 is a block diagram illustrating a principal part of the controller unit 7. In addition to the electric power assist control section 71 and the current control section 72 described above, the controller unit 7 includes a switching element driving circuit 21 and an inverter 22 as illustrated in FIG. 2. The inverter 22 includes six switching elements 61A, 62A, 63A, 61B, 62B, and 63B as illustrated in FIG. 2. The switching elements 61A and 61B form a pair which is connected to one of three phases of the motor 4. Similarly, the switching elements 62A and 62B form a pair which is connected to another one of the three phases of the motor 4, whereas the switching elements 63A and 63B form a pair which is connected to the other one of the three phases of the motor 4. Further, the current sensors 19 are respectively provided to the switching elements 61B, 62B, and 63B. The current sensors 19 detect the currents flowing through the respective phases of the motor.

A vehicle-speed signal detected by the vehicle-speed sensor 11 is input to the electric power assist control section 71 through an interface 31, whereas a steering torque signal detected by the torque sensor 3 is input thereto through an interface 32. The electric power assist control section 71 determines the direction and the degree of a motor torque according to the vehicle-speed signal and the steering torque signal, calculates the target current for electric power assist from the thus determined motor torque, and inputs the target current for electric power assist to the current control section 72. Moreover, an interface 33 receives a motor rotation angle signal from the angle sensor 6 to input the motor rotation angle to the electric power assist control section 71 and the current control section 72. An interface 34 receives detected current signals of the respective phases of the motor from the three current sensors 19 to input a detected current of the motor to the current control section 72.

The current control section 72 calculates a voltage instruction according to the target current for electric power assist, the detected current of the motor, and the rotation angle of the motor. The switching element driving circuit 21 performs PWM modulation on the voltage instruction to instruct the inverter 22 to perform a switching operation. In response to a switching operation signal, the inverter 22 realizes chopper control of the switching elements 61A to 63A and 61B to 63B. By electric power supplied from a battery 23, the current is made to flow through the motor 4. The motor torque, that is, the assist torque is generated by the current.

The inverter 22 described above has a configuration for the three-phase motor. When the motor 4 is a DC motor with a brush, an H-bridge circuit is suitably used instead.

Figure 3:
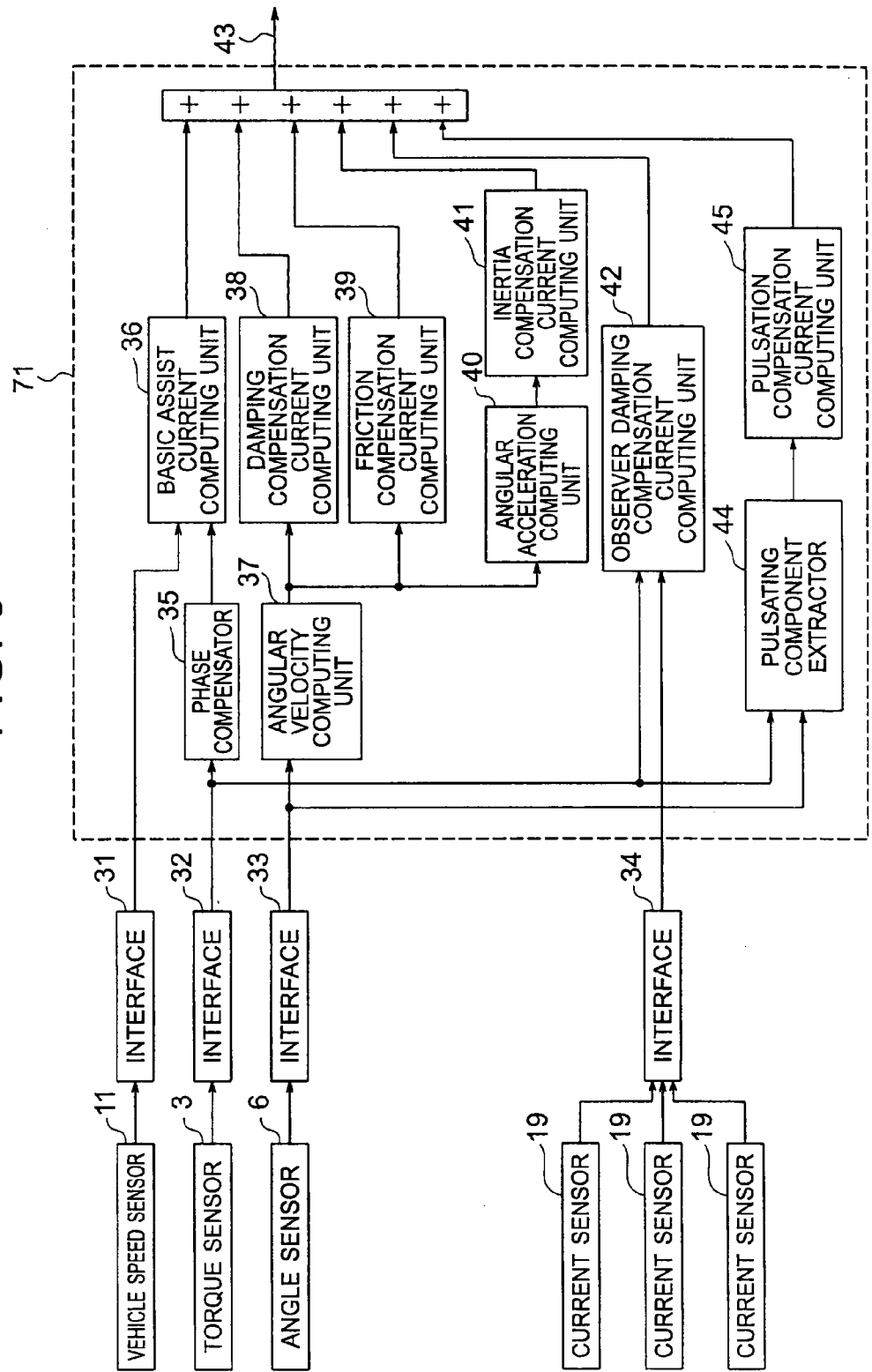
FIG. 3 is a block diagram illustrating a configuration of an electric power assist control section 71 according to the first embodiment of the present invention.

FIG. 3 is a block diagram illustrating a configuration of the electric power assist control section 71. The electric power assist control section 71 includes a microcomputer. Outputs from the vehicle-speed sensor 11, the torque sensor 3, the angle sensor 6, and the current sensors 19 are read through the interfaces 31 to 34 into the microcomputer as digital values at predetermined sampling time intervals.

The electric power assist control section 71 includes a phase compensator 35, a basic assist current computing unit 36, an angular velocity computing unit 37, a damping compensation current computing unit 38, a friction compensation current computing unit 39, an angular acceleration computing unit 40, an inertia compensation current computing unit 41, an observer damping compensation current computing unit 42, a pulsating component extractor 44, and a pulsation compensation current computing unit 45. In FIG. 3, the reference numeral 43 denotes the target current for electric power assist which is output from the electric power assist control section 71.

The steering torque detected by the torque sensor 3 is input to the phase compensator 35 which in turn performs phase compensation on the steering torque to improve a frequency characteristic. In the basic assist current computing unit 36, a value of a basic assist current according to the phase-compensated steering torque and the vehicle speed is prestored as a map value. Upon input of the phase-compensated steering torque output from the phase compensator 35 and the vehicle speed detected by the vehicle-speed sensor 11, the basic assist current computing unit 36 uses the stored map value to compute the basic assist current according to the phase-compensated steering torque and the vehicle speed. When the vehicle speed is low, the value of the basic assist current is increased with respect to the phase-compensated steering torque. In this manner, the steering torque to be applied by the driver at the time of low-speed running, for example, for parking the vehicle, is reduced to facilitate steering. Although a method of obtaining the basic assist current by map computation performed in the basic assist current compensator 36 has been described, the basic assist current may also be obtained by computation using multiplication with a gain.

The angular velocity computing unit 37 differentiates the motor rotation angle detected by the angle sensor 6 to compute a motor rotation angular velocity. The damping compensation current computing unit 38 multiplies the motor rotation angular velocity by a control gain to compute a damping compensation current. The damping compensation current has the effects of improving the convergence of the steering wheel. For the damping compensation current computing unit 38, a map such as the control gain and constants such as a proportionality factor, which are required for the computation, are preset in a ROM. The friction compensation current computing unit 39 computes a friction compensation current based on a sign of the motor rotation angular velocity. The friction compensation current varies according to the sign of the motor rotation angular velocity. The friction compensation current is a current for causing the motor 4 to generate a torque for canceling a friction existing in a steering mechanism and has the effect of improving the steering feel. The angular acceleration computing unit 40 differentiates the motor rotation angular velocity computed by the angular velocity computing unit 37 to compute a motor rotation angular acceleration. The inertia compensation current computing unit 41 computes an inertia compensation current from the motor rotation angular acceleration. The inertia compensation current cancels an inertia force of the motor, and hence the steering feel is improved.

The observer damping compensation current computing unit 42 uses an observer to estimate a vibration velocity of the motor 4 from the steering torque detected by the torque sensor 3 and the current of the motor 4 detected by the current sensors 19, and computes an observer damping compensation current for application of a damping torque.

The observer damping compensation current computing unit 42 is now described. A steering mechanism is represented by equilibrium between the steering torque input by the movement of the steering wheel by the driver, the assist torque generated by the motor, and a reaction torque mainly generated by a reaction force from tires. On the other hand, steering vibrations generally occur at a high frequency of 30 Hz or higher. At this high frequency, fluctuations in steering wheel angle and in road surface reaction force become negligibly small. Thus, the motor 4 can be regarded as a vibration system supported by a torque sensor having a spring property. Accordingly, if a rotation speed observer is configured based on a motion equation which corresponds to the vibration system, for example, a vibration equation having an inertia moment of the motor as an inertia term and a stiffness of the torque sensor as a spring term, the rotation speed of the motor in a frequency band higher than the steering frequency can be estimated without using a differentiator, which is otherwise required to obtain a voltage drop in a coil from a coil current.

Although the computation performed in the observer damping compensation current computing unit 42 can also be performed by using the current of the motor 4 detected by the current sensors 19 and the motor rotation angle detected by the angle sensor 6, the computation is performed using the steering torque detected by the torque sensor 3 and the current of the motor 4 detected by the current sensors 19, in this embodiment. The reason is described below. In the high-frequency band in which the steering vibrations occur, the steering wheel scarcely moves because of the retention of the steering wheel by the driver and the effects of the inertia of the steering wheel itself. Therefore, a torsion angle of the torque sensor having the spring property can be regarded as the motor rotation angle. Therefore, an output of the torque sensor is divided by a spring constant of the torque sensor. After removing the steering frequency component from the result of division, the sign is reversed. As a result, a signal equivalent to the rotation angle of the motor 4 can be obtained. Thus, the observer damping compensation current computing unit 42 uses the vibration equation having the inertia moment of the motor as the inertia term and the stiffness of the torque sensor as the spring term to estimate the rotation speed based on the signal equivalent to the rotation angle of the motor 4 and the current of the motor 4 detected by the current sensors 19.

The observer damping compensation current computing unit 42, the basic assist current computing unit 36, the damping compensation current computing unit 38, the friction compensation current computing unit 39, and the inertia compensation current computing unit 41 are known art described in JP 3712876B.

Next, the basic assist current, the damping compensation current, the friction compensation current, the inertia compensation current, and the observer damping compensation current, which are obtained as described above, are added by adding means such as an adder to obtain the target current for electric power assist 43.

Figure 4:
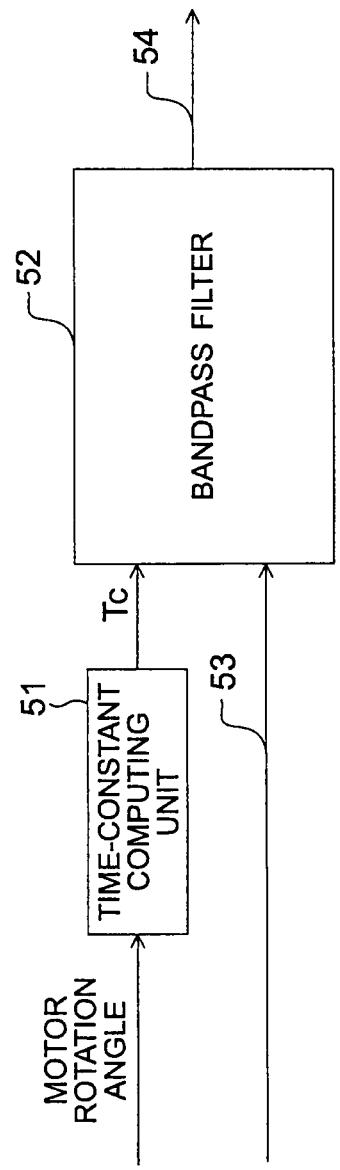
FIG. 4 is a block diagram illustrating a configuration of a pulsating component extractor 44 according to the first embodiment of the present invention.

The pulsating component extractor 44 removes the steering component of the driver, a noise component in a frequency band higher than the frequency of the pulsating component, and the like from the steering torque detected by the torque sensor 3 to extract the pulsating component of the steering torque due to the cogging torque or the torque ripple. FIG. 4 is a block diagram illustrating an example of a configuration of the pulsating component extractor 44. As illustrated in FIG. 4, the pulsating component extractor 44 includes a time-constant computing unit 51 and a bandpass filter 52.

In the electric motor, the cogging torque, which is generated due to a motor structure such as the number of poles and the number of slots of the motor or a fabrication error, and the torque ripple, which is generated due to magnetic saturation of a core and the like, are generated with the rotation of the electric motor. When the number of pole pairs of the motor is Pn and an electrical angle of the motor is $\theta e$, a mechanical angle θm of the motor (which corresponds to the motor rotation angle) is expressed by Equation (1).

$$\theta m = \theta e / Pn \quad (1)$$

Let a value obtained by dividing the number of torque pulsations generated for one revolution of the motor by the number of pole pairs Pn be a torque-ripple generation harmonic order n. In general, there are a plurality of the torque-ripple generation harmonic orders n for the electric motor, and n is an integer. Components with n=1, 2, 6, 12 and the like are generated.

A frequency fn [Hz] of the torque ripple of an n-th order generation harmonic component is expressed by Equation (2-1).

$$fn = (d\theta m/dt)/(360) \times Pn \times n \quad (2\text{-}1)$$

Specifically, the frequency fn [Hz] of the torque ripple varies according to the motor rotation angular velocity dθm/dt.

Accordingly, a center frequency fc of the bandpass filter is set so as to be equal to fn, as expressed by Equation (2-2).

$$fc = fn \quad (2\text{-}2)$$

Further, a time constant Tc of the bandpass filter is set according to Equation (2-3).

$$Tc = 1/(2\pi fc) \quad (2\text{-}3)$$

If a variable time-constant filter obtained by setting the time constant of the bandpass filter according to Equation (2-3) is used for the steering torque detected by the torque sensor 3, the steering component of the driver, the noise component in the frequency band higher than that of the pulsating component, and the like can be removed from the detected steering torque to extract the pulsating component of the steering torque due to the cogging torque or the torque ripple. The computations according to Equations (2-1) to (2-3) are executed in the time-constant computing unit 51 illustrated in FIG. 4. As the bandpass filter 52, for example, a fourth-order bandpass filter expressed by Equation (3) is used. In the equation, Gbpf is a transfer function of the filter, and is a Laplace operator. Moreover, K1 is a correction gain for a gain which becomes −12 dB at the center frequency fc [Hz] and is set so that the gain becomes 0 dB at the center frequency fc [Hz].

[Equation 1]

$$Gbpf = K1 \frac{\left(\frac{1}{2\pi fc}s\right)^2}{\left(\frac{1}{2\pi fc}s + 1\right)^4} = K1 \frac{(Tcs)^2}{(Tcs+1)^4} \quad (3)$$

Figure 7:
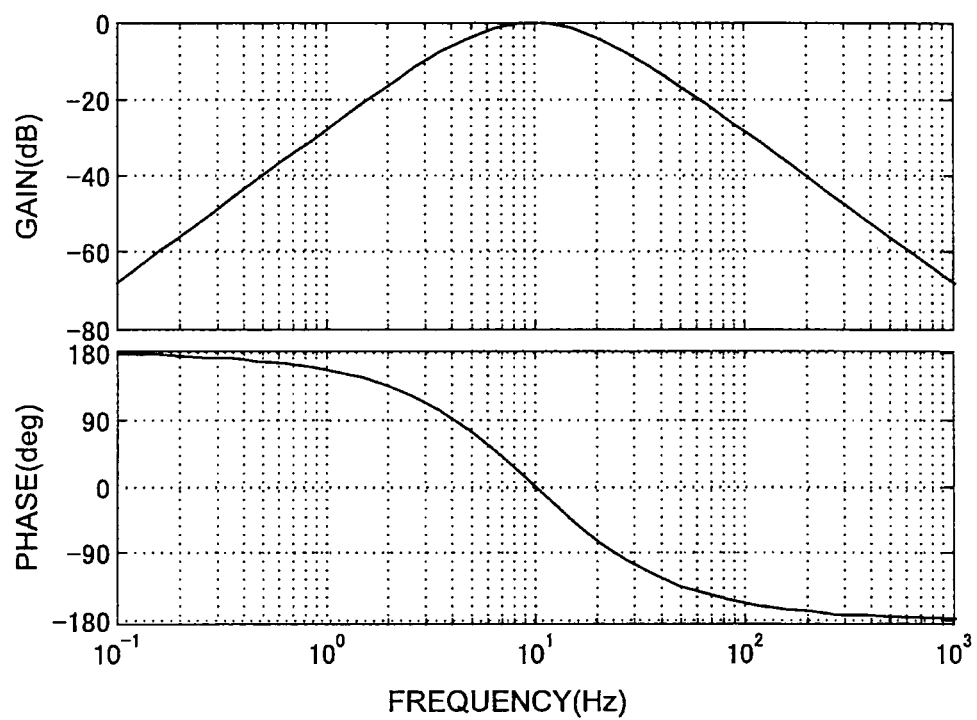
FIG. 7 is an explanatory view illustrating an example of a frequency-response characteristic of the bandpass filter.

FIG. 7 illustrates a frequency-response characteristic of the bandpass filter when the center frequency fc is set to 10 Hz. From the characteristic illustrated in FIG. 7, the pulsating component can be extracted with the gain of 0 dB and a phase delay of 0 at the center frequency fc (10 Hz). The other components both at a low frequency and a high frequency can be removed with a slope of −40 dB/decade. Therefore, the pulsating component can be extracted from an input signal 53 to the filter with good accuracy.

Figure 5:
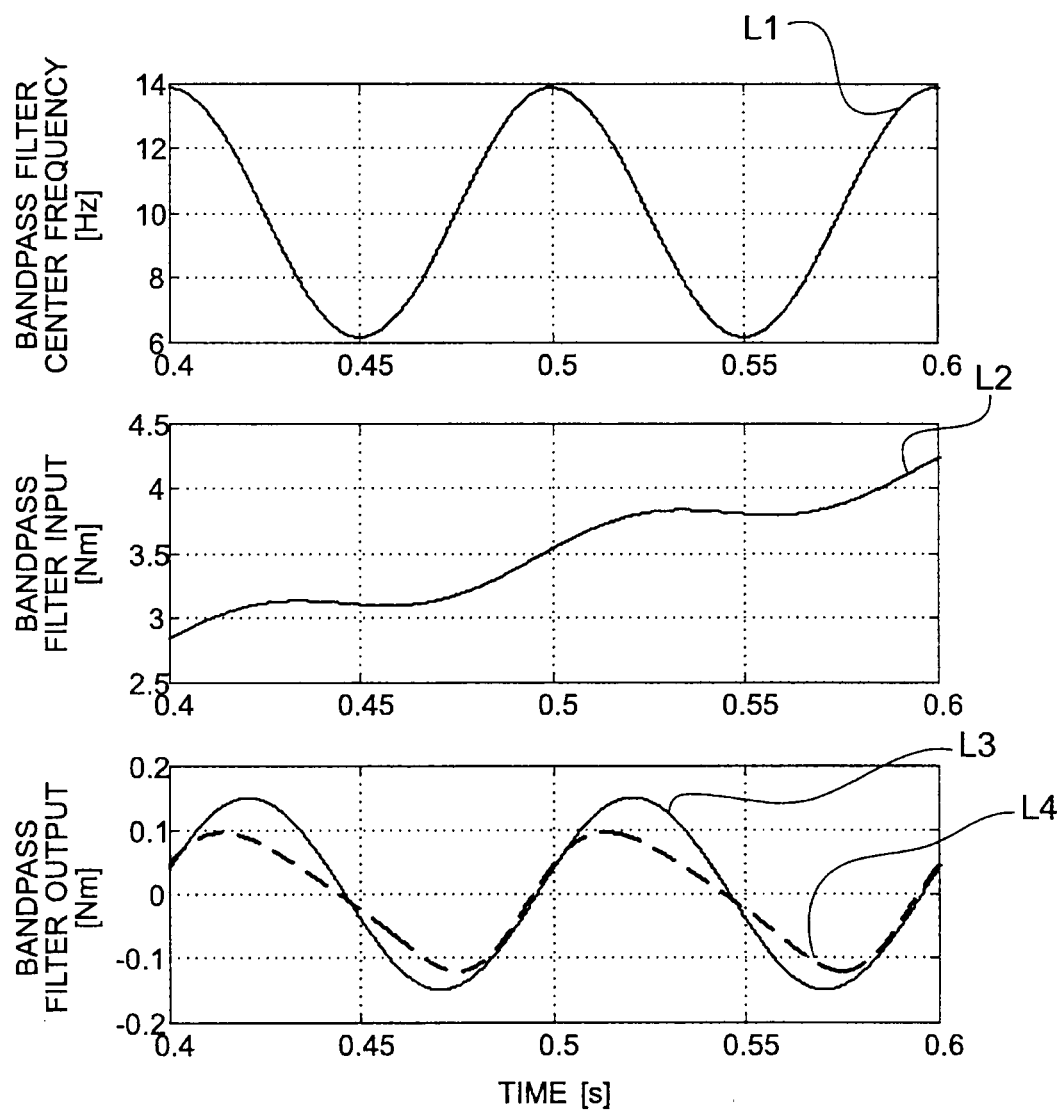
FIG. 5 is an explanatory view illustrating the results of bandpass filter processing using a pulsating time constant.

However, the motor rotation angle also pulsates due to the cogging torque or the torque ripple, and hence the pulsating component is also undesirably contained in the motor rotation angular velocity dθm/dt, which is obtained by differentiating the motor rotation angle. Specifically, if the frequency fn of the torque ripple is computed by using the motor rotation angular velocity dθm/dt, which is obtained by differentiating the motor rotation angle, as expressed by Equation (2-1) to modify the time constant of the bandpass filter, the time constant varies depending on the frequency of the torque ripple. It is newly found that the variation in time constant depending on the frequency of the torque ripple distorts an output value of the bandpass filter to disadvantageously lower the accuracy of extraction of the pulsating component of the steering torque, which is generated due to the cogging torque or the torque ripple. FIG. 5 is a graph illustrating the results of bandpass filter processing using the pulsating time constant. In FIG. 5, L1 is the center frequency which is set according to the rotation angular velocity dθm/dt containing the pulsating component, L2 is the steering torque input to the bandpass filter, which contains the steering component and the pulsating component, L3 is the pulsating component applied to the steering torque component, and L4 is the output value of the bandpass filter. By comparison between L2 and L4 illustrated in FIG. 5, it is understood that the steering component by the driver is successfully removed to extract the pulsating component of the steering torque. By comparison between L3 and L4, however, it is understood that L4 is distorted and the accuracy of extraction of the pulsating component is lowered.

Figure 6:
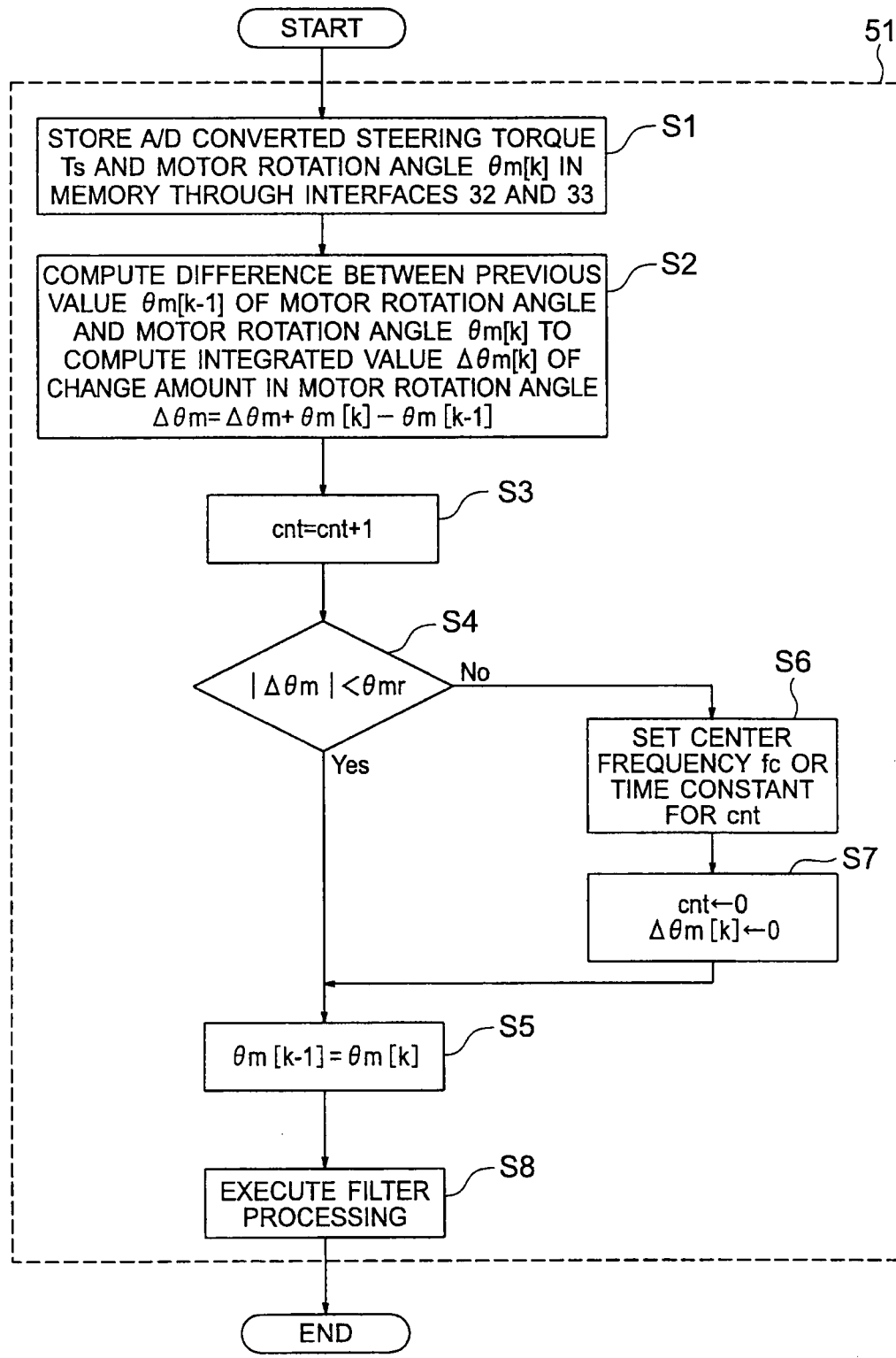
FIG. 6 is a flowchart illustrating an operation of the pulsating component extractor 44 according to the first embodiment of the present invention.

In view of the new problem described above, a countermeasure for further suppressing the pulsation of the time constant is additionally provided to the pulsating component extractor 44. As a result, the distortion due to the pulsation of the time constant is removed. The steering component of the driver, the noise component in the frequency band higher than the frequency of the pulsating component, and the like are removed from the steering torque detected by the torque sensor 3. In this manner, the pulsating component of the steering torque due to the cogging torque or the torque ripple is extracted with good accuracy. FIG. 6 is a flowchart illustrating an operation series of the pulsating component extractor 44. The time-constant computing unit 51 is used to compute the time constant of the bandpass filter from the motor rotation angle. As the input signal 53 to the bandpass filter 52, for example, a signal, for example, the steering torque or the motor rotation angle, from which the pulsating component is desired to be extracted, is input. The bandpass filter 52 is configured, for example, as expressed by Equation (3) described above.

The operation series of the pulsating component extractor 44 is described according to the flowchart of FIG. 6. As control illustrated in the flowchart of FIG. 6, for example, when an ignition switch is closed, initial values are set. Specifically, Δθm=0 and cnt=0, and the detected motor rotation angle θm[k−1] are set. An initial value of the center frequency fc is an upper limit value of the center frequency fc, which is described below. After that, the operation is started and is executed at predetermined execution intervals in an endless loop until the ignition switch is opened. Each of the predetermined execution intervals Ts is set so as to be executed at intervals shorter than the frequency fn [Hz] of the target torque ripple, and is set, for example, Tsmp=0.005 seconds or less.

As illustrated in FIG. 6, in Step S1, the steering torque Ts which is subjected to A/D conversion (analog/digital conversion) and the motor rotation angle θm[k] are stored in the memory through the interfaces 32 and 33. In Step S2, a difference between the previous value θm[k−1] of the motor rotation angle and the motor rotation angle θm[k] is com puted as expressed by Equation (4) to compute an integrated value Δθm[k] of a change amount in motor rotation angle.

$$\Delta\theta m[k]=\Delta\theta m+\theta m[k]-\theta m[k-1] \quad (4)$$

In Step S3, the number of sampling times cnt required for the integrated value Δθm[k] of the change amount in motor rotation angle to become a reference angle θmr or larger is counted. Specifically, cnt×Tsmp is equal to a time required for the integrated value Δθm[k] of the change amount in motor rotation angle to become the reference angle θmr or larger.

In Step S4, an absolute value of the integrated value Δθm[k] of the change amount in motor rotation angle and the preset reference angle θmr are compared with each other. When the absolute value of the integrated value Δθm[k] of the change amount in motor rotation angle is less than the reference angle θmr, the operation proceeds to Step S5. When the absolute value of the integrated value Δθm[k] of the change amount in motor rotation angle is equal to or larger than the reference angle θmr, the operation proceeds to Step S6.

A method of setting the reference angle θmr is now described. The reference angle θmr is set by Equation (5) according to the generation harmonic order n of the torque ripple to be extracted. In the equation, K2 is a gain which is an integer.

$$\theta mr=K2\times 360/n/Pn[\text{deg}] \quad (5)$$

The above-mentioned reference angle is represented in mechanical angle. A reference angle θmre in electrical angle is as expressed by Equation (6).

$$\theta mre=K2\times 360/n[\text{deg}] \quad (6)$$

Figure 8:
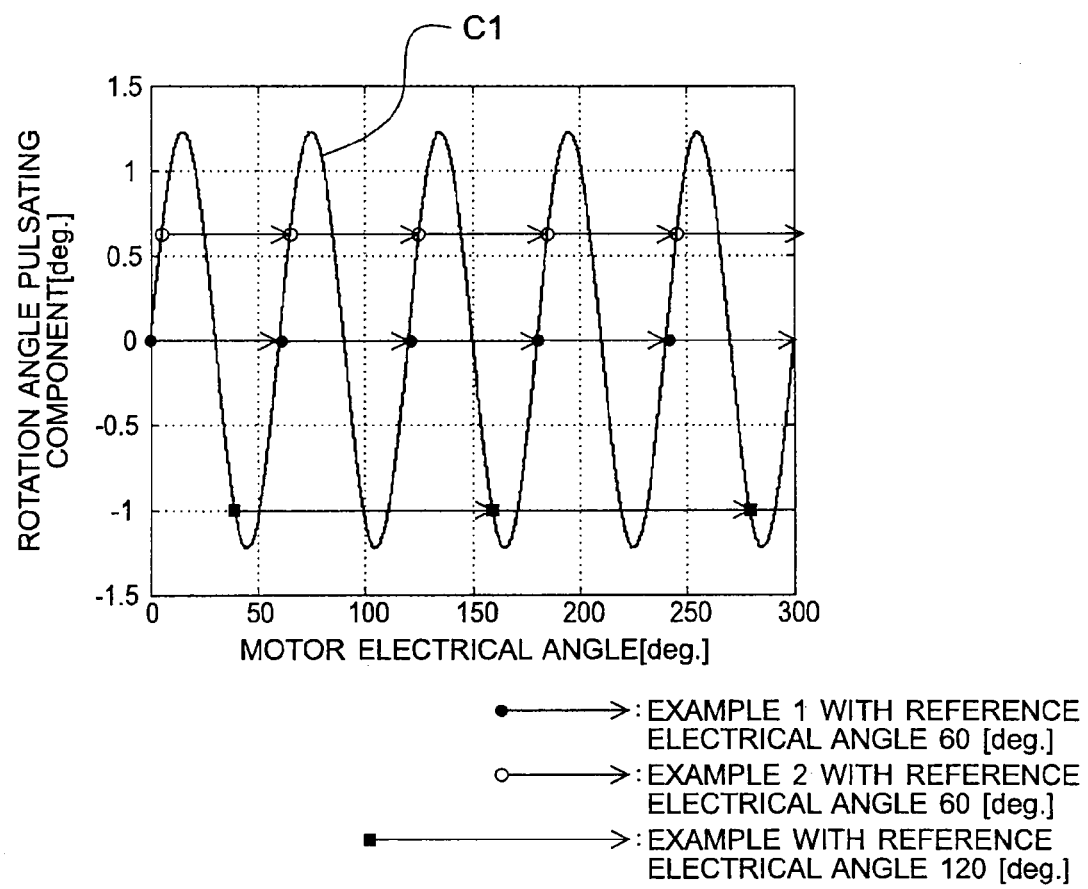
FIG. 8 is an explanatory view illustrating effects obtained by setting a reference angle according to the first embodiment of the present invention.
Figure 9:
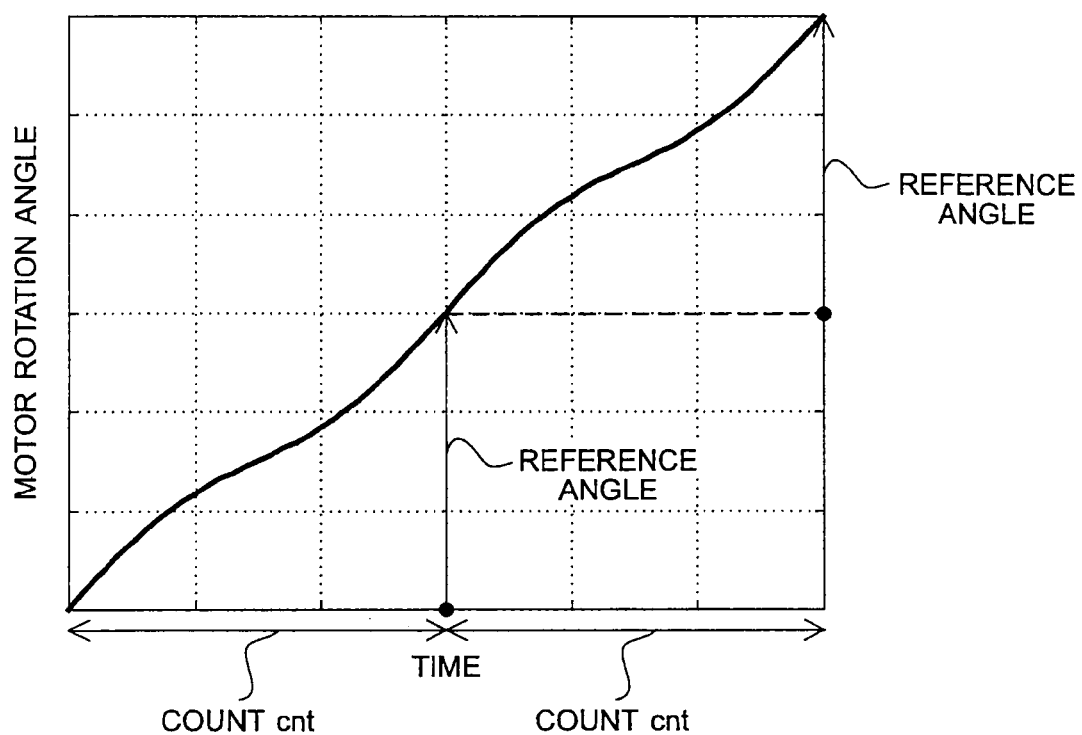
FIG. 9 is an explanatory view illustrating a relation between a change amount in motor rotation angle, which corresponds to a reference angle, and a counted number of sampling times according to the first embodiment of the present invention.

Specifically, 360/n is a reference angle corresponding to one period of the cogging torque or the torque ripple to be extracted. For example, when the torque ripple component with the generation harmonic order n of 6 is extracted, the reference angle θmre is obtained as an integer multiple of 60 degrees. FIG. 8 illustrates the effects obtained by setting the reference angle as described in this embodiment. For easy understanding, a rotation angle pulsating component C1 with the generation harmonic order n of 6, which is obtained by removing the steering component, is illustrated in FIG. 8. By setting the reference angle in the manner as described above, the number of sampling times cnt can be counted at timing at which the pulsating component is equal in phase, as illustrated in FIG. 8. Therefore, after the effects of the rotation angle pulsating component are removed, the number of sampling times required for the change to be equal to or larger than the reference angle θmr can be counted, as illustrated in FIG. 9.

In Step S6, the center frequency is set according to Equation (7) using the number of sampling times cnt which is required for the integrated value of the change amount in motor rotation angle to become equal to the reference angle θmr or larger.

$$fc=(\theta mr/(cnt\times Tsmp))/360\times Pn\times n \quad (7)$$

Figure 10:
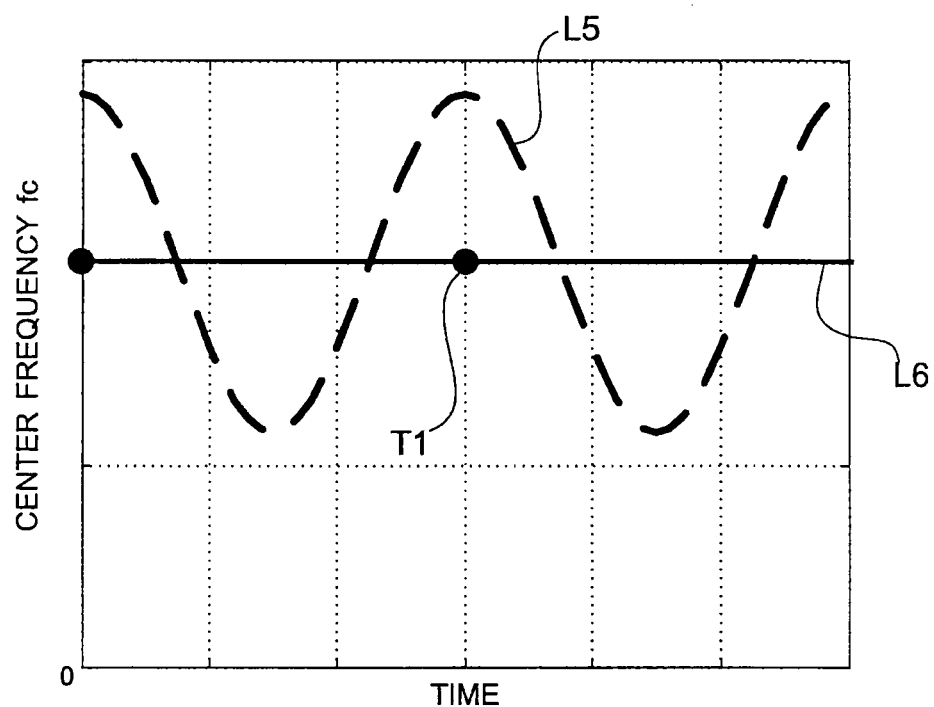
FIG. 10 is an explanatory view illustrating effects of a method of setting the time constant according to the first embodiment of the present invention.

The effects of the method of setting the center frequency according to the present invention are illustrated in FIG. 10. In FIG. 10, T1 is timing at which the time constant is computed in Step S6. Moreover, in FIG. 10, L5 is the result of computing the rotation angular velocity dθm/dt of the motor by each sampling to set the center frequency fc according to Equations (2-1) and (2-2), and L6 is the result of setting the center frequency fc according to Equation (7) of this embodiment. It is understood from L6 that the center frequency fc can be set while the effects of the pulsating components of the rotation angle are removed. The time constant Ts=1/(2πfc) is computed from the center frequency fc. Moreover, in Step S6, the time constant has a constant value until the time constant is updated. Meanwhile, the filter has the time constant which does not vary with time, and therefore, becomes resistant to noise and the like. By the method of setting the time constant according to this embodiment, even if the steering speed changes to vary the frequency fn of the torque ripple, the effects of the pulsating component of the rotation angle can be removed to set the time constant corresponding to the frequency fn of the torque ripple.

Further, the center frequency fc for the number of sampling times cnt or the value of the time constant Tc=1/(2πfc) may be prestored so as to set the time constant Tc=1/(2πfc) according to the number of sampling times cnt in Step S6. In this manner, a computing load can be reduced.

Moreover, a lower limit value and an upper limit value are set for the center frequency fc. For example, the lower limit value is set to 5 Hz or higher. When the center frequency fc becomes equal to the lower limit value or lower, the frequency of the steering component of the driver and that of the pulsating component due to the torque ripple become close to each other. As a result, there is a fear that the steering component of the driver cannot be sufficiently removed from the output value of the bandpass filter. For the upper limit value, an upper limit value of a region of the frequency desired to be extracted may be suitably set. In the case of a digital filter, the upper limit value may be set from a Nyquist frequency.

In Step S7, the number of sampling times cnt and the integrated value Δθm[k] of the change amount in motor rotation angle are reset to 0.

Figure 11:
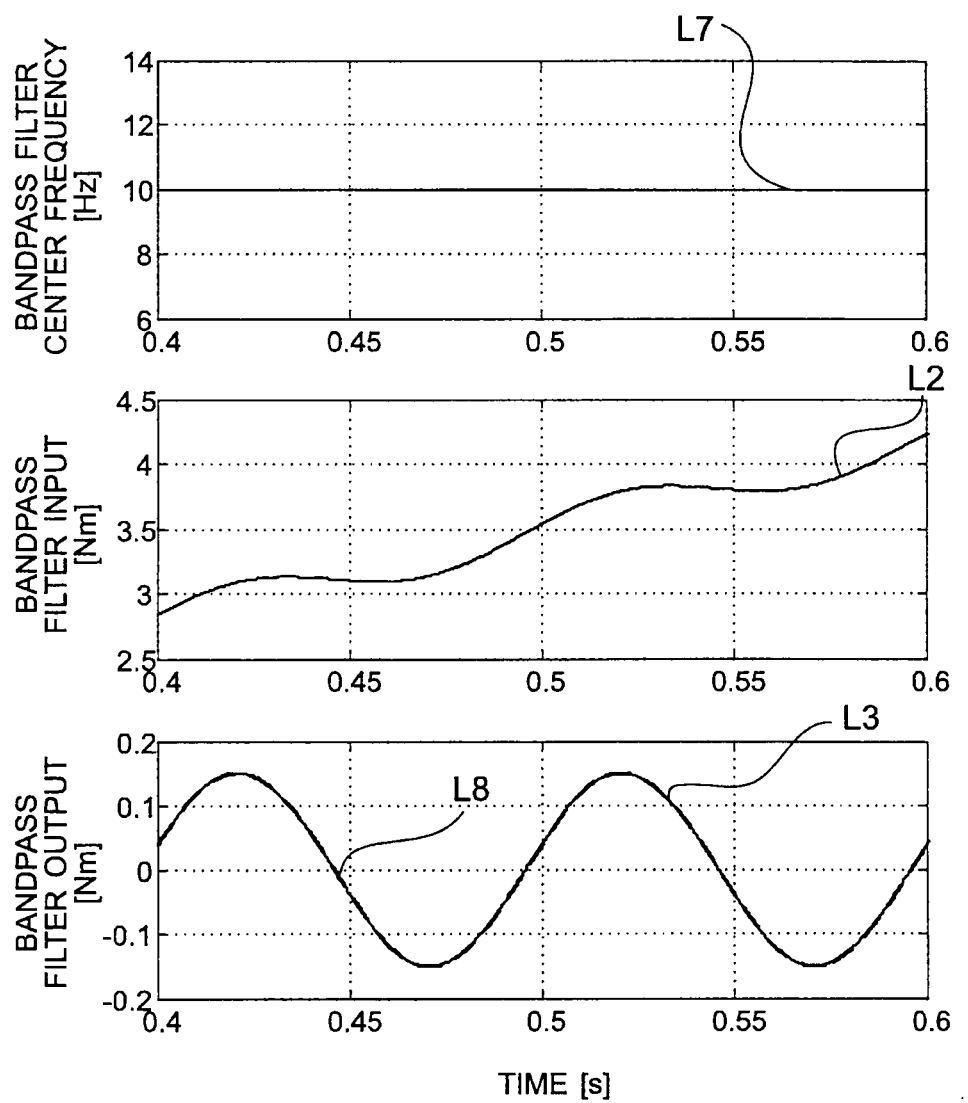
FIG. 11 is an explanatory view illustrating effects of extraction of a pulsating component according to the first embodiment of the present invention.

In Step S5, the motor rotation angle θm[k] is stored as θm[k−1]. In Step S8, the filtering processing expressed by Equation (3) using the set time constant is executed to output an output signal 54. For example, the steering torque Ts is used as the input signal 53 to the filter. The effects of extraction of the pulsating components according to this embodiment are illustrated in FIG. 11. In FIG. 11, L7 represents the center frequency set according to Equation (7) of this embodiment, L8 represents the output value of the bandpass filter, and L2 and L3 are the same as those illustrated in FIG. 5. By comparison between L1 illustrated in FIG. 5 and L7 illustrated in FIG. 11, it is understood that the pulsating components of the center frequency fc of the bandpass filter are successfully removed in L7 according to this embodiment. Moreover, in comparison with L4 illustrated in FIG. 5, the pulsating component of the steering torque is extracted with good accuracy in L8 illustrated in FIG. 11.

If there are a plurality of the pulsations to be extracted, the reference angle and the number of sampling times cnt may be computed according to the torque ripple-generation harmonic order of each of the pulsations. In such a case, however, the pulsating component having a smaller torque ripple-generation harmonic order sometimes effects the number of sampling times cnt for the pulsating component having a larger torque ripple-generation harmonic order.

Figure 12:
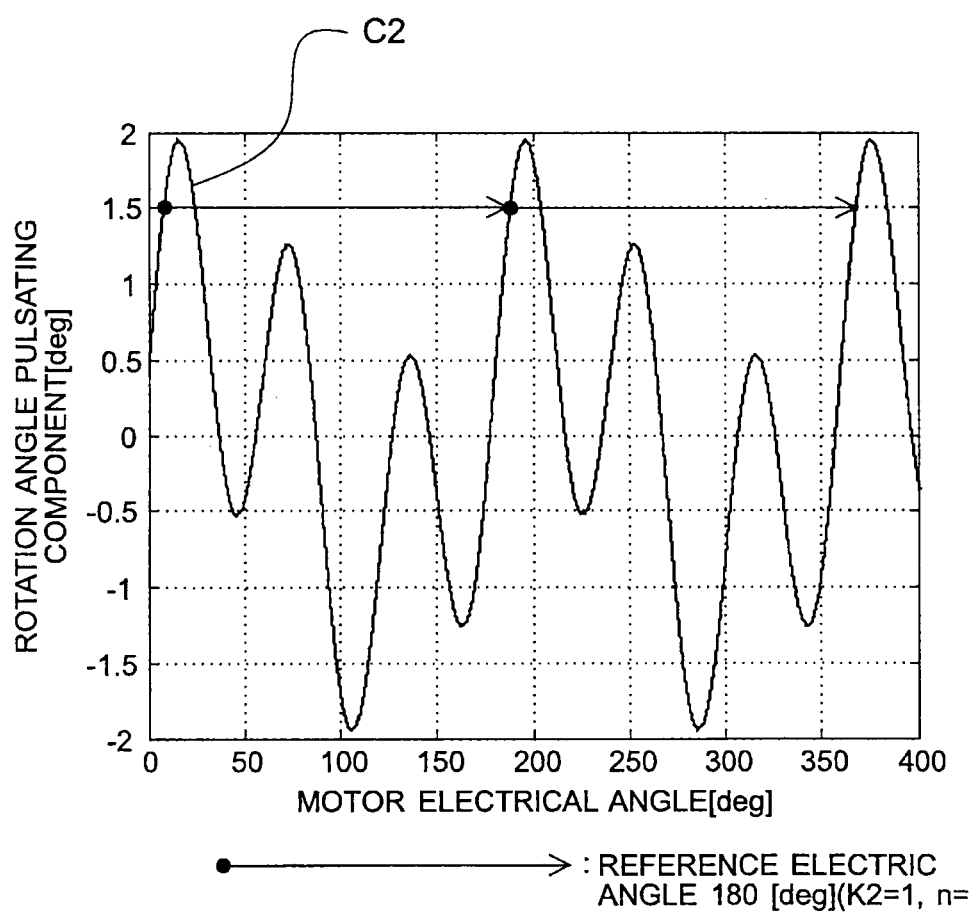
FIG. 12 is an explanatory view illustrating the setting of the reference angle according to the first embodiment of the present invention when there are a plurality of pulsating components to be extracted.

Therefore, if there are the plurality of pulsations to be extracted, the reference angle is set from the smallest torque ripple-generation harmonic order of the pulsation by using Equations (5) and (6). Then, the center frequency or the time constant for each of the pulsations is set using Equation (7). In this manner, the pulsating components can be removed from the time constants respectively for the plurality of pulsations to be extracted. FIG. 12 is a graph illustrating setting of the reference angle when there are the plurality of pulsation components to be extracted. In FIG. 12, C2 represents the pulsating component containing the rotation angle pulsating components respectively with the generation harmonic order n of 6 and the generation harmonic order n of 2. The torque ripple generation harmonic orders n desired to be extracted are 2 and 6, and hence the reference angle 180 [deg] are set with K2=1 and n=2. When K2 is set large, the reference angle also becomes large. Therefore, resistance to a fluctuation in rotation angle due to noise or the like is increased.

In the pulsation compensation current computing unit 45 illustrated in FIG. 3, the pulsation compensation current for reducing the pulsating component is computed according to the pulsating component extracted by the pulsating component extractor 44. For example, the pulsating compensation current is obtained by multiplying the pulsating component extracted by the pulsating component extractor 44 by a proportional gain. The pulsation compensation current is added to the target current for electric power assist to correct the target current for electric power assist.

The current control section 72 illustrated in FIG. 2 controls the current of the motor 4 so that the current of the motor 4 becomes equal to the thus corrected target current for electric power assist. As a result, the pulsation of the steering torque due to the cogging torque or the torque ripple or the like can be reduced.

As described above, according to this embodiment, the time constant from which the pulsating component is removed can be set. The thus set time constant is modified according to the frequency of the torque ripple. Therefore, even while the driver is steering, the effects of removing the steering component and the noise from a state quantity used in the steering control device, for example, from the steering torque or the motor rotation angle to remove the components other than the pulsating component generated due to the cogging torque or the torque ripple having the varying frequency to extract the pulsating component generated due to the cogging torque or the torque ripple with good accuracy are obtained. Moreover, the pulsating component generated due to the cogging torque or the torque ripple, which is contained in the time constant, can be reduced, and hence the distortion of the output value of the bandpass filter can be suppressed. As a result, the pulsating component generated due to the cogging torque or the torque ripple can be extracted with good accuracy. Further, the pulsation compensation current is computed with the extracted pulsating component, and hence the pulsation generated in the steering torque or the like can be appropriately reduced while the interference with the steering feel is prevented.

Moreover, the time constant computing unit 51 computes the time constant based on the time required for the rotation angle of the motor 4 to rotate by the preset reference angle, and hence the steering component and the noise are removed from the state quantity such as the steering torque to extract the pulsating component generated due to the cogging torque or the torque ripple having the varying frequency with good accuracy. Further, the pulsation of the time constant can be suppressed. Thus, the distortion of the output value of the filter can be reduced to extract the pulsating component generated due to the cogging torque or the torque ripple having the varying frequency with higher accuracy.

Moreover, the reference angle, which is preset for the rotation angle of the motor 4, is the integer multiple of the rotation angle corresponding to one period of the cogging torque or the torque ripple, and hence the steering component or the noise can be removed from the state quantity such as the steering torque to extract the pulsating component generated due to the cogging torque or the torque ripple having the varying frequency with good accuracy. Further, the pulsation of the time constant can be suppressed. Therefore, the distortion of the output value of the filter can be reduced to extract the pulsating component generated due to the cogging torque or the torque ripple having the varying frequency with higher accuracy.

Further, the target current for electric power assist is corrected according to the output signal of the variable time-constant filter, and hence the pulsation of the steering torque due to the cogging torque or the torque ripple can be suppressed.

Although the bandpass filter is configured as expressed by Equation (3) in this first embodiment, the bandpass filter is not limited thereto. For example, a lower cutoff frequency fc1 and an upper cutoff frequency fc2 may be set to different values. Moreover, the bandpass filter may be configured as a Butterworth filter or an elliptic filter. As a result, a steeper cutoff characteristic can be obtained in comparison with the bandpass filter configured as expressed by Equation (3). Moreover, although the order of the filter is fourth in Equation (3), the order is not limited thereto. For example, a second-order filter may be used. In such a case, a computing load is reduced. However, in order to sufficiently remove the steering component, the filter is preferred to have the order of fourth or higher.

Further, although the filter is the bandpass filter in this first embodiment, the method of setting the time constant according to this first embodiment can also be applied to setting of the time constant of a lowpass filer or a highpass filter. By setting the time constant of the highpass filter according to the method of the present invention to remove the steering component and setting the time constant of the lowpass filter to a constant value, the computing load can be reduced.

Further, although the time constant is computed using the motor rotation angle in this first embodiment, the computation of the time constant is not limited to that using the motor rotation angle. A value relating to the motor rotation angle such as a rotation angle of the steering wheel may be used, or an estimated value of the motor rotation angle may also be used. The signal input to the filter is not limited to the steering torque. The state quantity used in the steering control device, for example, the motor rotation angle, a motor rotation speed, or the like may also be used instead.

The invention claimed is:

1. A steering control device, comprising:
   a torque detecting section for detecting a steering torque applied by a driver;
   a motor for generating an assist torque for assisting the steering torque;
   an electric power assist control section for computing a target current for electric power assist of the motor, which is required for generating the assist torque, based on the detected steering torque;
   an angle detecting section for detecting a rotation angle of the motor;
   a current control section for controlling a current of the motor so that the current of the motor becomes equal to the target current for electric power assist; and
   a pulsating component extractor for extracting a pulsating component of the steering torque, comprising:
   a variable time-constant band pass filter having a variable time constant;
   a time-constant computing section for computing a time constant of the band pass filter, by using the rotation angle of the motor, so that the center frequency of the band pass filter can vary according to a frequency of a cogging torque or a torque ripple generated by the motor, wherein a torque-ripple generation harmonic order is an integer;

wherein the pulsating component of the steering torque is extracted by performing filter processing on the steering torque by the variable time-constant band pass filter, wherein a compensation current, which is calculated according to the extracted pulsating component of the steering torque, is added to the target current for electric power assist to correct the target current for electric power assist.

2. A steering control device according to claim 1, wherein the variable time-constant band pass filter has an order of fourth or higher.

3. A steering control device according to claim 1, wherein the variable time-constant band pass filter sets a lower limit value of a center frequency to 5 Hz or higher.

4. A steering control device according to claim 1, wherein the time-constant computing section suppresses a pulsation of the calculated result of the time constant which is generated due to the fact that the time constant of the band pass filter is calculated by using the rotation angle of the motor which includes the pulsating component according to the cogging torque or torque ripple.

5. A steering control device according to claim 4, wherein the time-constant computing section presets therein a reference angle for the rotation angle of the motor, and computes the time constant based on a time period required for the motor to rotate by the reference angle.

6. A steering control device according to claim 5, wherein the reference angle is an integer multiple of a rotation angle corresponding to one period of the cogging torque or the torque ripple.

7. A steering control device, comprising:
- a torque detecting section for detecting a steering torque applied by a driver;
- a motor for generating an assist torque for assisting the steering torque;
- an electric power assist control section for computing a target current for electric power assist of the motor, which is required for generating the assist torque, based on the detected steering torque;
- an angle detecting section for detecting a rotation angle of the motor;
- a current control section for controlling a current of the motor so that the current of the motor becomes equal to the target current for electric power assist; and
- a pulsating component extractor for extracting a pulsating component of the rotation angle of the motor, comprising:
- a variable time-constant band pass filter having a variable time constant;
- a time-constant computing section for computing a time constant of the band pass filter, by using the rotation angle of the motor, so that the center frequency of the band pass filter can vary according to a frequency of a cogging torque or a torque ripple generated by the motor, wherein a torque-ripple generation harmonic order is an integer;
- wherein the pulsating component of the rotation angle of the motor is extracted by performing filter processing on the rotation angle of the motor by the variable time-constant band pass filter,
- wherein a compensation current, which is calculated according to the extracted pulsating component of the rotation angle of the motor, is added to the target current for electric power assist to correct the target current for electric power assist.

8. A steering control device according to claim 7, wherein the variable time-constant band pass filter has an order of fourth or higher.

9. A steering control device according to claim 7, wherein the variable time-constant band pass filter sets a lower limit value of a center frequency to 5 Hz or higher.

10. A steering control device according to claim 7, wherein the time-constant computing section suppresses a pulsation of the calculated result of the time constant which is generated due to the fact that the time constant of the band pass filter is calculated by using the rotation angle of the motor which includes the pulsating component according to the cogging torque or torque ripple.

11. A steering control device according to claim 10, wherein the time-constant computing section presets therein a reference angle for the rotation angle of the motor, and computes the time constant based on a time period required for the motor to rotate by the reference angle.

12. A steering control device, comprising:
- a torque detecting section for detecting a steering torque applied by a driver;
- a motor for generating an assist torque for assisting the steering torque;
- an electric power assist control section for computing a target current for electric power assist of the motor, which is required for generating the assist torque, based on the detected steering torque;
- an angle detecting section for detecting a rotation angle of the motor;
- a current control section for controlling a current of the motor so that the current of the motor becomes equal to the target current for electric power assist; and
- a pulsating component extractor for extracting a pulsating component of the motor rotation speed of the motor, comprising:
- a variable time-constant band pass filter having a variable time constant;
- a time-constant computing section for computing a time constant of the band pass filter, by using the rotation angle of the motor, so that the center frequency of the band pass filter can vary according to a frequency of a cogging torque or a torque ripple generated by the motor, wherein a torque-ripple generation harmonic order is an integer;
- wherein the pulsating component of the motor rotation speed of the motor is extracted by performing filter processing on a motor rotation speed of the motor by the variable time-constant band pass filter,
- wherein a compensation current, which is calculated according to the extracted pulsating component of the motor rotation speed of the motor, is added to the target current for electric power assist to correct the target current for electric power assist.

13. A steering control device according to claim 12, wherein the variable time-constant band pass filter has an order of fourth or higher.

14. A steering control device according to claim 12, wherein the variable time-constant band pass filter sets a lower limit value of a center frequency to 5 Hz or higher.

15. A steering control device according to claim 12, wherein the time-constant computing section suppresses a pulsation of the calculated result of the time constant which is generated due to the fact that the time constant of the band pass filter is calculated by using the rotation angle of the motor which includes the pulsating component according to the cogging torque or torque ripple.

16. A steering control device according to claim 15, wherein the time-constant computing section presets therein a reference angle for the rotation angle of the motor, and computes the time constant based on a time period required for the motor to rotate by the reference angle.

* * * * *